United States Patent Office 2,726,950
Patented Dec. 13, 1955

2,726,950

PREPARATION OF FINELY DIVIDED METAL POWDERS

Horace Freeman, Cap de la Madeleine, Quebec, Canada

No Drawing. Application March 24, 1952,
Serial No. 278,312

9 Claims. (Cl. 75—0.5)

This invention relates to the preparation of finely divided metal powders and more particularly substantially pure metal in finely divided form which may be used efficiently in that form in the fabrication, under heat and pressure, of mechanical shapes and parts such as gears, bearings, casters, wheels and the like.

Metal powders such as those of iron, copper, cobalt, nickel and tungsten are often prepared from their metallic oxides or the metals containing some combined oxygen, by reduction. The reduction may be accomplished by means of various forms of carbon or by means of reducing gases such as hydrogen, carbon monoxide or their mixtures such as producer gas. In carrying out the manufacture, the metal oxide must first be reduced to the particle sizes required in the metal powder since once the metal is reduced it cannot be ground owing to its plasticity or softness; whereas the metal oxides are readily ground. The use of carbon in admixture with the ground metal oxides while providing for rapid reduction has the disadvantage of leaving residual carbon and impurities together with unreduced oxide in the finished metal powder from which they cannot be completely separated by any known means.

The object of the present invention is to provide a method in which is used an organic reducing agent which extracts the oxygen from the metal without leaving in the reduced metal residual impurities which are undesirable in the fabrication of parts from the metal powder.

A further object is to provide a method in which is used an organic reducing agent, which, in the early stage of the reducing operation, by decomposition provides a reducing atmosphere and at higher temperature provides volatile decomposition products which effectively extract oxygen and pass off in vapour form, leaving substantially pure metal in finely divided form.

It has been found that urea or its isotope carbamide is an effective reducing agent for the purpose described. It is readily available in substantially pure crystals reasonably free from water. When heated to fusion at a temperature of not less than 132° C. any contained water is removed. When further heated ammonia is released, leaving a white or yellowish white solid residue comprising a mixture of biuret, cyanic acid and ammonium cyanate and/or cyanuric acid, which constitutes a volatile reducing agent.

When the, preferably anhydrous, urea is mixed with the finely divided oxygen-containing metal two important functions are performed in the reducing furnace. The ammonia released in the initial heating temperature is decomposed into hydrogen and nitrogen to provide a reducing atmosphere in the mass. At higher temperature the solid residue is completely decomposed into the reducing gases, hydrogen and carbon monoxide in admixture with inert nitrogen. These reducing gases remove the oxygen from the metal under treatment and are removed in the form of vapour, leaving no contaminating residue.

An important effect is that the finely divided oxygen-containing metal is further dispersed, thus developing a porous structure even before actual reduction begins. As a result the finely divided particles are reduced to a finer size and even to colloidal dimensions and rapid reduction of the oxide takes place and much finer sponge metal particles are obtained. Costly and extremely fine grinding is thus avoided. The particles of metal may thus be produced similar in size to those obtained by pyrolytic decomposition of organic metal compounds, such as iron formate. This spongy structure is of particular advantage for many of the uses of metal powders. For example very finely divided and spongy iron so obtained has particular use in the manufacture of magnets and magnetic cores, while fine nickel powder is of value in the preparation of storage battery plates. Spongy cobalt likewise finds a use in the preparation of magnets and cutting tools and spongy copper has a variety of uses.

In carrying out the method of the invention the oxygen-containing metal is ground to pass, for example, a 100 mesh screen. Precipitated metal oxide may be used. The amount of oxygen in the ground oxide is ascertained to determine the amount of urea to be used. In the case of iron oxide containing 28% oxygen not less than 56 parts of dry urea per 100 parts of iron oxide should be used. In the case of copper containing 20% of oxygen, and which is relatively easily reduced, 40 parts of urea per 100 parts of copper oxide is effective. However an excess of urea is not harmful since in the reduction process the urea is decomposed to volatile gases, leaving no residue. In general the amount of urea to be used is about double the weight of oxygen contained in the metal oxide to be treated.

The finely divided oxygen-containing metal and urea are intimately mixed and the mixture is gradually heated to cause the decomposition of the urea, as above indicated, to remove the oxygen from the metal and leave metal uncontaminated with residual solid material. The final temperature need not be higher than 950° C. for the oxides of iron, nickel, copper, cobalt and tungsten and is preferably considerably lower in order to minimize sintering together of the reduced particles. The reduction may be effected in a batch operation but preferably in a continuous operation in a furnace in which containers for the mixture pass on a conveyor through progressive temperature zones and to a cooling zone where the material is protected by an inert or reducing atmosphere before being exposed to the air. It usually suffices to cool the metal products of reaction in the gases produced by the reaction.

As the mixture is heated fusion of the reducing agent and the evolution of gas create a pasty and more or less fluid foaming mass until a low red temperature is reached. Thus the containers should not be filled in order to avoid overflow. In batch operation the mixture may be preheated with stirring in relatively large mass until the foaming ceases and solidification ensues and upon further heating the porous mass is rapidly reduced owing to the intimate contact of the metal oxide with the volatile reducing agents formed by the decomposition of the urea.

Use of this reducing agent requires application of less external heat than in case of others heretofore used. When copper oxide is thus reduced there is even an evolution of heat sufficient to cause the mass to become red hot once the mass is ignited. If the reacting oxides are not agitated a lightly sintered spongy metal cake is obtained which is easily rubbed to powder. If the masses be agitated or stirred during reduction free running powders, which may be screened for use without grinding or crushing, are obtained.

It is to be particularly observed that the use of urea and its pyrolytic decomposition products, as the reducing agent, result in much finer and more porous metal particles, requiring less external heat and less reaction time, and at the same time the metal particles are not contaminated with the reducing agent.

It will be apparent that important advantages of the invention may be obtained by using the complex solid residue obtained by heating urea at a temperature of 200 to 300° C., although the use of urea per se is preferred, since the ammonia gas, evolved in the initial heating, provides an economical reducing atmosphere for the hotter reducing zone of the furnace.

The term "urea" as used in the appended claims is intended to mean the above residue, as well as urea and its isotope carbamide per se.

I claim:

1. A method of producing spongy metallic products from metal oxides which are reducible by hydrogen or carbon monoxide which comprises mixing the metal oxide with urea to serve as a reducing agent, heating the mixture to decompose the urea into non-oxidizing vapour and a solid residue, further raising the temperature of the mass to decompose the solid residue into reducing vapours to remove oxygen from the metal and render the reduced metal porous and free from contaminating residue and cooling the mass in a non-oxidizing atmosphere.

2. The method defined in claim 1 in which urea is used in quantity sufficient to combine with all the oxygen in the oxygen-containing metal under treatment.

3. The method defined in claim 1 in which urea is used in an amount not less than twice the weight of oxygen in the oxygen-containing metal under treatment.

4. The method defined in claim 1 in which the mixture is heated gradually to first decompose the urea into said non-oxidizing vapour and reducing agent at temperatures below the melting point of the reduced metal.

5. A method of producing a spongy mass of fine particles from oxygen-containing metals reducible by hydrogen and carbon monoxide which comprises mixing urea with finely divided oxygen-containing metal, gradually heating the mixture to temperatures below the melting point of the reduced metal to decompose and volatilize the urea within the mass to render the same porous and to reduce the metal oxide to metal, and cooling the mass in the inert atmosphere so formed before exposing it to an oxidizing atmosphere.

6. A method as defined in claim 1 in which the mixture is heated above the fusion point of urea until foaming ceases and thereafter at a temperature below the melting point of the reduced metal.

7. A method of producing metal in finely divided form which comprises mixing urea with an oxide of the metal, heating the mixture to form a spongy mass of the metal without contaminating residue and rubbing the mass into powder form.

8. The method defined in claim 7 wherein the mixture is agitated during heating to convert the metal into powder form.

9. A method of producing pure metal which comprises mixing an oxide of the metal with the solid residue obtained by removing ammonia from urea at a temperature of 200 to 300° C. and heating the mixture to reduce the oxide to metal.

References Cited in the file of this patent

UNITED STATES PATENTS

| 950,869 | Schilling | Mar. 1, 1910 |
| 1,988,861 | Thorausch et al. | Jan. 22, 1935 |

FOREIGN PATENTS

| 573,338 | Great Britain | Nov. 16, 1945 |

OTHER REFERENCES

A Course in Powder Metallurgy, pages 37 and 38. Edited by Baeza. Published in 1943 by the Reinhold Publishing Corp., New York.